United States Patent Office 3,438,381
Patented Apr. 15, 1969

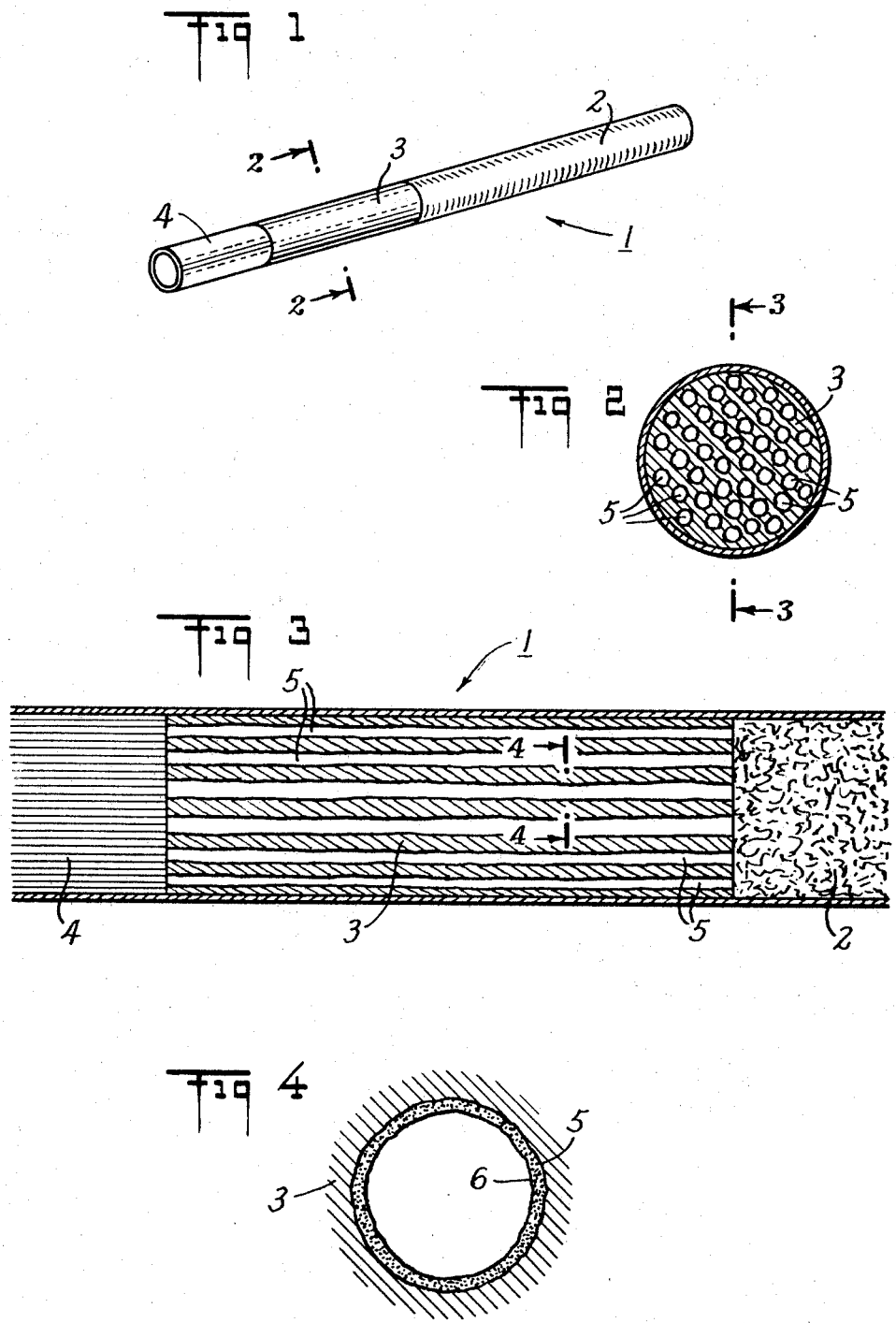

3,438,381
FILTER FOR TOBACCO PRODUCTS
Edith A. Hale, 310 E. 44th St.,
New York, N.Y. 10017
Filed Feb. 1, 1967, Ser. No. 613,208
Int. Cl. A24d 1/04; A24f 7/04
U.S. Cl. 131—267                2 Claims

ABSTRACT OF THE DISCLOSURE

A tobacco smoke filter having formed therein a plurality of longitudinal tunnels each having a roughened wall structure. The tunnels are coated with a viscous substance, such as honey, to trap noxious ingredients in the smoke.

---

The present invention relates to mechanical filters and, in particular, to filters which are especially adapted to eliminate undesired impurities from tobacco smoke.

There has been considerable information published recently concerning the putative carcinogenic effect of tobacco smoke. The tobacco industry has responded to some degree by providing various types of dry filters in combination with tobacco products such as cigarettes. Dry filters presently in use do not hold the tar and other harmful substances to any appreciable extent because the smoke is also dry and the adhesive effect of the filter is, therefore, minimum.

According to the present invention, there is contemplated a wet filter, the wetness being provided by an adhesive or mucilaginous substance having sufficient viscosity as to remain within the filter in use yet having enough flow for filling in manufacture. An example of such a substance is bee honey. Other examples will be given below. The filter body is fabricated from plastic such as polyethylene and there is formed in the solid filter a multiplicity of longitudinal channels or tunnels, the sides of which are abraded or roughened to aid in holding the honey or other substance within the filter and to afford the smoker maximum exposure to and contact with the honey.

One object of the invention is to provide a new and improved filter for tobacco products.

Other objects and advantages of the invention may be appreciated on reading the following description of one embodiment of the invention illustrated in the accompanying drawings, in which:

FIG. 1 is a perspective view of a cigarette which includes my new and improved filter;

FIG. 2 is an enlarged section in plan taken on the line 2—2 of FIG. 1;

FIG. 3 is a longitudinal section taken on the line 3—3 of FIG. 2 showing the filter in detail; and FIG. 4 is a fragmentary section further enlarged taken on the line 4—4 of FIG. 3.

Referring to the drawings, the cigarette 1 comprises a tobacco filled chamber 2, the improved filter 3 and mouth piece 4 made conventionally of porous cellulose. The filter 3 is made of a thermoplastic material and there are formed therein hollow passages or tunnels 5 coated with a natural or synthetic adhesive and viscous liquid 6 which is introduced into the passages under pressure as by aerosol spray. The passages are crinkled or roughened to facilitate retention of the liquid and to provide maximum exposure and contact between the liquid and the tobacco smoke.

The liquid may be honey. Other substances may be used such as sugar cane syrups and molasses, syrup of vegetable origin, maple tree syrup, milk sugar syrup, syrup of fruit origin. Other adhesive substances are made from resins and gums of tree origin such as pine treee resin, cedar tree resin, sweet gum from sweet gum tree, kauri gum from kauri pine tree, myrrh gum, resin from myrrh tree, camphor gum from camphor tree, and other adhesives of animal derivation may be processed to a proper cohesive state such as glue from processed animal hoof, horn, blood and lymph; also gelatin from bones and connective tissues may be used.

It is obvious that the filter could be fabricated in the form of a separate cartridge which is removably disposed in a cigarette or cigar holder, or in a pipe stem. If desired, a flavoring may be incorporated in the viscous liquid contained in the filter where the liquid is otherwise flavorless. The filter body may also have a cellulosic base as does the conventional cigarette mouthpiece.

Various modifications of the invention may be effected by persons skilled in the art without departing from the principle and scope thereof.

What is claimed is:

1. In a tobacco smoking article, a filter comprising a solid elongated body having longitudinal tunnels formed therein and extending the entire length of said body, the wall surfaces of said tunnels having been roughened and said wall surfaces being substantially coated with a viscous, tar removing, adhesive liquid.

2. A filter as defined in claim 1 wherein said viscous liquid is selected from a group consisting of bee honey, sugar cane syrups and molasses, syrup of vegetable origin, maple tree syrup, milk sugar syrup, syrups of fruit origin, resins and gums of tree origin, natural glues and gelatins.

References Cited

UNITED STATES PATENTS

| | | | |
|---|---|---|---|
| 1,967,556 | 7/1934 | John | 131—9 |
| 2,904,050 | 9/1959 | Kiefer et al. | 131—267 X |
| 2,928,399 | 3/1960 | Touey | 131—266 |
| 2,928,400 | 3/1960 | Touey | 131—267 X |
| 3,167,076 | 1/1965 | Mare | 131—10.5 |
| 3,242,925 | 3/1966 | Sterne | 131—10.5 X |

FOREIGN PATENTS

| | | |
|---|---|---|
| 709,194 | 5/1965 | Canada. |
| 1,008,092 | 10/1965 | Great Britain. |
| 121,414 | 3/1944 | Australia. |
| 908,185 | 10/1962 | Great Britain. |

SAMUEL KOREN, *Primary Examiner.*

DENNIS J. DONOHUE, *Assistant Examiner.*

U.S. Cl. X.R.

131—10.5, 10.7.